J. E. MILLER.
PNEUMATIC STARTING DEVICE FOR INTERNAL COMBUSTION ENGINES.
APPLICATION FILED AUG. 11, 1911. RENEWED OCT. 26, 1917.
1,268,039.
Patented May 28, 1918.
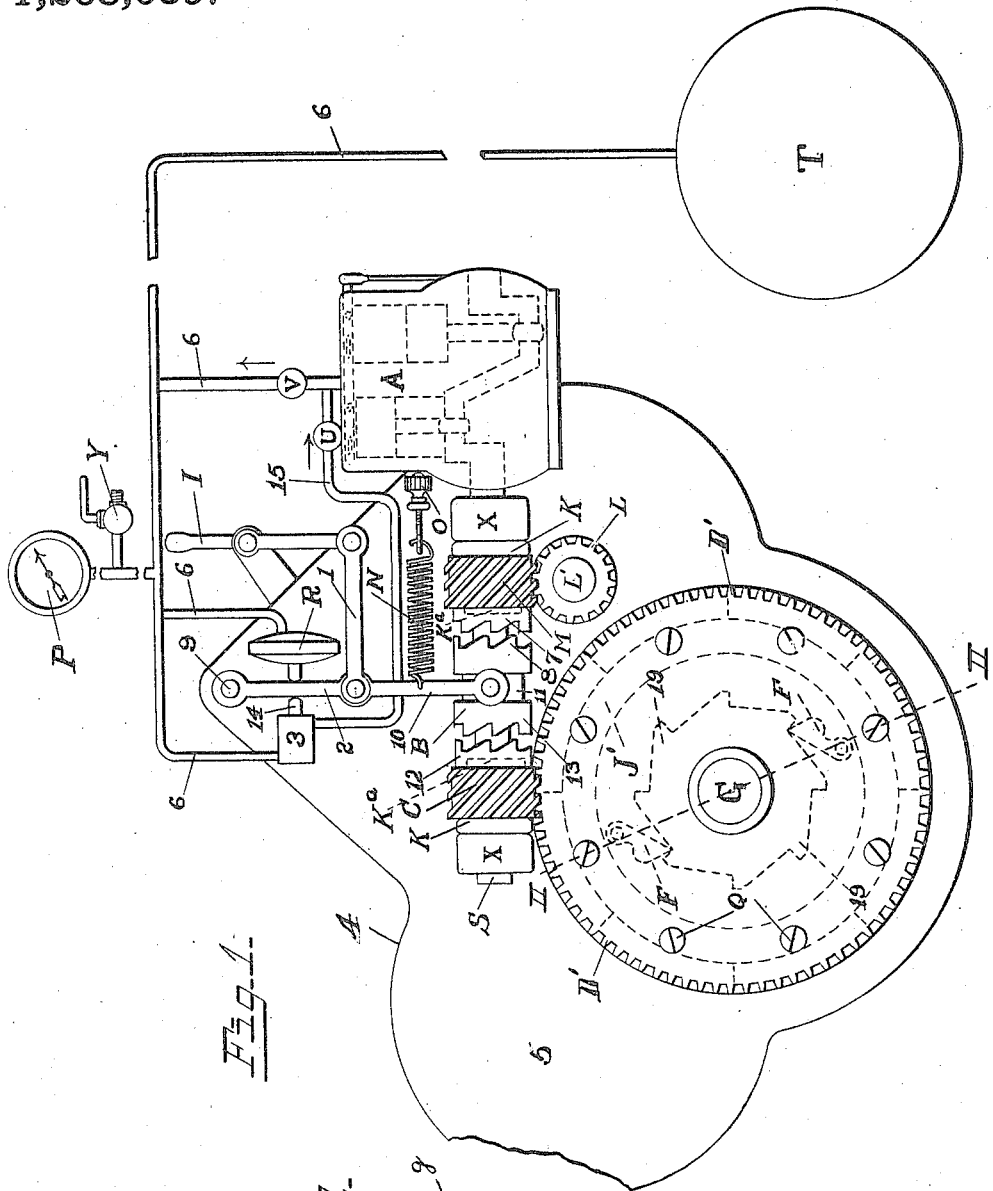
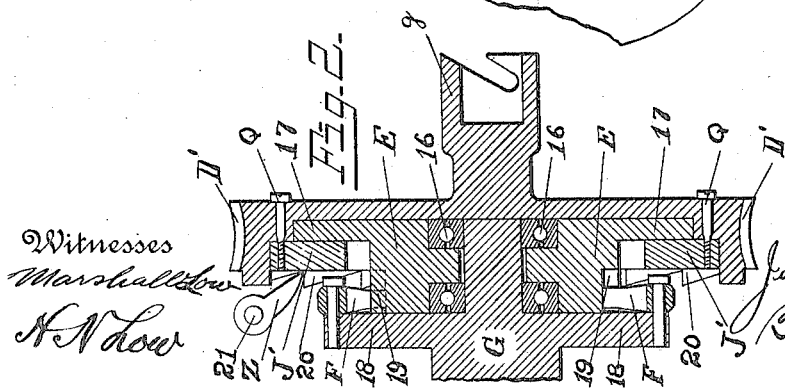

UNITED STATES PATENT OFFICE.

JOHN E. MILLER, OF MOLINE, ILLINOIS, ASSIGNOR TO MIDLAND MOTOR COMPANY, A CORPORATION OF ILLINOIS.

PNEUMATIC STARTING DEVICE FOR INTERNAL-COMBUSTION ENGINES.

1,268,039.   Specification of Letters Patent.   Patented May 28, 1918.

Application filed August 11, 1911, Serial No. 643,580. Renewed October 26, 1917. Serial No. 198,738.

*To all whom it may concern:*

Be it known that I, JOHN E. MILLER, a citizen of the United States, residing at Moline, in the county of Rock Island and State of Illinois, have invented certain new and useful Improvements in Pneumatic Starting Devices for Internal-Combustion Engines, of which the following is a specification, reference being had therein to the accompanying drawing.

In order to make the invention more clearly understood I have shown in the accompanying drawings means for carrying the same into practical effect, without limiting my improvements, in their useful applications, to the particular construction which, for the purpose of example, I have delineated.

In the said drawings,

Figure 1 is a front elevation of an internal combustion engine embodying the invention.

Fig. 2 is a sectional view of that portion of the mechanism which is more immediately connected with the crank shaft of the engine, on line II—II of Fig. 1.

In the drawings I have illustrated a type of engine and general arrangement of the parts suitable for embodiment in an automobile, but it will be understood that the starting device may be employed with other engines for which it is suitable.

Referring to the drawings, the crank shaft G of an internal combustion motor is shown supported in a crank case 5 which likewise carries the various actuating mechanisms of the starting device. The cylinders and other parts of the motor have been omitted from the drawings so as to bring out more clearly the arrangement of parts of the starting system and eliminate parts of the motor which are not directly connected therewith.

A is the air compressor which is or may be, by correlated parts, caused also to perform the functions of an air motor. T is the storage tank for the air compressed by the compressor A, which air is received through the air pipe 6. In this air pipe is arranged a check valve V which allows the air to flow freely from the compressor to the tank but prevents any return of the same.

S is the crank shaft of the air compressor extending across or into proximity to the engine shaft G. The shaft S is mounted in bearings X, X attached to the casing 5. M is a worm wheel mounted loosely on the shaft S and having fixed thereto a clutch member 7. L is a worm fixed on or integral with a shaft L' which extends from within the engine casing 5. The shaft L' may be arranged differently from the manner illustrated in the drawing, in fact, any shaft geared to the cam or crank shaft of the motor would answer the same purpose. That is to say, when the engine 4 is running the shaft L' and worm L will be rotated and consequently the worm wheel M.

B is a double clutch member arranged to slide on the shaft S but splined on said shaft so as to rotate with the same. When the member B is shifted to the right, in Fig. 1, its clutch face 8 will be caused to engage with the corresponding clutch member 7 of the worm wheel M, whereupon any rotation of the shaft L' will be communicated to the shaft S and the compressor A will perform its function of storing up compressed air in the tank T. 2 is a lever pivoted at 9 to the casing 5 and engaging by its lower forked end 10 a groove 11 in the clutch element B, whereby it is enabled, when shifted, to engage or disengage the clutch 8 with or from the clutch member 7. N is a spring connected with the lever 2 and adjustably connected with the casing 5 by means of an adjusting screw O, by which latter the tension of the spring may be regulated. This spring tends to keep the clutch 8 in engagement with the clutch 7 and cause the actuation of the compressor A. R is an air expansion chamber connected interiorly by the pipe 6 with the tank T, and bearing at its outer face upon the lever 2, whereby, when the pressure in the tank T has reached the predetermined limit the chamber R will expand (toward the left in Fig. 1) and thereby actuate the lever 2 to withdraw the clutch 8 from the clutch 7 and to bring the air compressor to rest.

I will now describe means by which the compressor A can be caused to also perform the functions of an air motor, receiving power from the compressed air in the tank T, to "crank" the shaft G of the engine. 12 is a clutch member mounted loosely on the shaft S and adapted to be engaged by the clutch face 13 of the sliding member B. When so engaged, if the shaft S be in motion, a rotation will be imparted to the clutch member 12. I is a lever located in the case of an automobile at or near the dash-board thereof and connected by a link 1 with the clutch shifting lever 2. By these devices the clutch elements 13 and 12 may be caused to engage. 3 is check valve in the pipe 6 having a projecting stem 14 which bears against the lever 2, and 15 is an air pipe communicating with the air pipe 6 through the valve 3 and leading to the valve chamber of the compressor A (now considered as a motor) at any suitable point. It may communicate with the pipe 6 between the valve V and the compressor A. U is a check valve in the pipe 15 which permits the flow of compressed air through the pipe 15 in the direction from the valve 3 to the compressor, or motor, A, but prevents any flow of the air in the opposite direction. When the hand lever I is operated to engage the clutch members 12 and 13 the valve stem 14 will be forced inward, the valve 3 opened and compressed air admitted through the pipe 15 to the motor A, whereupon the pistons of said motor will be actuated and the shaft S revolved, thereby turning the part B and its engaged part 12. K indicates adjusting and abutting washers or thrust collars on the shaft S for properly locating the loose rotary elements on said shaft. K$^a$ indicates collars fixed on the shaft S and coöperating with the collars K for the same purpose.

The mechanical connections between the clutch element 12 and the main engine shaft G, adapted to transmit the rotary motion of the former to the latter, and thereby "crank" the engine shaft, may be of any suitable character. I prefer, and have illustrated, the following: C is a worm attached to the clutch element 12 and engaging a corresponding worm gear D′ connected with the engine shaft G. The gear D′ (Fig. 2) is integral with the hub $g$, which latter may be formed, as shown, for engagement by an ordinary hand crank. E is a flanged hub mounted by ball bearings 16 to turn on the shaft G. The flange 17 of said hub is clamped yieldably to the face of the gear D′ by an internal ring J′ held to place by bolts Q. The face of the gear and the inner face of the ring may be covered with anti-friction facings to secure the proper contact with the flange 17. This flange 17 may also be faced with an anti-friction substance if desired. I thus provide a two-part friction and yieldable connecting device interposed between the air motor and the engine shaft. The details of the same may be varied, the essence of the arrangement being to secure such friction contact that normally, when the worm gear is turned forward the crank shaft of the car is rotated in the same direction, but when a back firing takes place, and a consequent reversal of the engine, the said yieldable device will give and permit such reversed motion without destruction to the air motor or connecting mechanism.

F indicates pawls hinged upon the flanged head 18 of the shaft G and engaging suitable ratchet teeth 19 on the hub E. The ratchet teeth are so presented that when the hub is rotated forwardly they will engage the pawls to turn the shaft G. After the motor is started the pawls will be rapidly rotated and caused by centrifugal force to fly out from engagement with the ratchet teeth 19.

In order that any reversal of the engine shall not cause strain on the worm C and gear D′, the rear edge of the rim of the gear is provided with a ratcheted face 20 engaged by a pawl Z hung on the gear case at 21. This pawl positively prevents the backward turning of the gear D′, so that in the event of back firing the gear is held fixed and the flange 17 is left to turn therein.

The pipe 6 from the tank T may terminate in a pressure gage P located conveniently so that the pressure may be determined at all times by the operator. Y is an outlet valve for auxiliary uses of air from the tank T. It is obvious that the compressed air may thus be used for pumping up tires, actuating a motor generator for producing electricity for lights, for the operation of air brakes, for cleaning or for other uses.

What is claimed is:—

1. In a starting device for internal combustion engines, the combination of an engine shaft, a countershaft connected with the said engine shaft, a compressed air system, a combination air motor and compressor included in the air system, means operable at will for connecting the engine shaft with the said combination motor and compressor, means operable at will for connecting the said countershaft with the motor and compressor, and automatic means for disengaging the last mentioned connection when the pressure in the air system reaches a predetermined point.

2. In a starting device for internal combustion engines, the combination of a main engine having a crank shaft and a countershaft, a combined compressor and motor having a shaft, two power transmitting devices mounted loosely on the latter shaft, mechanical connections between one of said power transmitting devices and the countershaft of the engine, mechanical connections between the other of said power transmitting devices and the crank shaft of the engine, means for connecting either of said power transmitting devices with the shaft of the motor and compressor to revolve with the same, a compressed air storage tank, and pipes for conducting air from the motor and compressor to the storage tank to be stored therein and for conducting the stored air to the motor and compressor to actuate the latter as a motor, substantially as set forth.

3. In a starting device for internal combustion engines, the combination of a main engine, an air compressor and motor, a compressed air storage tank, an air pipe leading from the compressor and motor and having a check valve opening toward the tank, a second air pipe through which compressed air may be received by the compressor and motor from the storage tank and which is provided with a check valve opening toward the compressor and motor, a third valve controlling the passage of compressed air through the second air pipe, a loose mechanical connection between the shaft of the compressor and motor and a countershaft of the engine, a second loose mechanical connection between the shaft of the compressor and motor and the crank shaft of the engine, means for connecting up either of the said mechanical connections for the transmission of power, which means engages the said third valve to open the same and allow compressed air to pass to the compressor and motor when the second mechanical connection is operated between the shaft of the motor and compressor and the crank shaft of the engine, substantially as set forth.

4. In a starting device for internal combustion engines, the combination of a main engine, a compressed air storage tank, a combined air compressor and motor having a shaft, a rotary power transmitting and clutch element on the latter shaft and connected with a shaft of the engine to receive motion therefrom, a second power transmitting and clutch element on the shaft of the compressor and motor and connected with the crank shaft of the engine to transmit power thereto, an intermediate clutch device shiftable on the shaft of the compressor and motor and connected to rotate therewith, a movable part engaging the said intermediate clutch device and adapted to shift the same into engagement with either of said power transmitting and clutch elements, air pipes connecting the motor and compressor with the storage tank, check valves in the said pipes and controlling the passage of compressed air with reference to the motor and compressor as described, an air expansion chamber connected interiorly with the storage tank and engaging the said movable part to actuate the same at a predetermined air pressure, and a valve on one of said air pipes for controlling the passage of compressed air from the storage tank to the compressor and motor which valve is connected with and adapted to be opened by the said movable part when the latter is shifted to operatively connect the shaft of the compressor and motor with the crank shaft of the engine, substantially as set forth.

5. In a starting device for internal combustion engines, the combination of an engine crank shaft, a compressed air supply, a combination air motor and compressor included in the air system, means operable at will for connecting the engine shaft with the said combination motor and compressor, means operable at will and independent of the first mentioned means for connecting the engine shaft with the said combination motor and compressor, and automatic means for disengaging one of the said connections when the pressure in the air system reaches a predetermined point.

6. In a starting device for internal combustion engines, the combination of an engine shaft, a compressed air system, a combination air motor and compressor included in the said system, two independent connections between the engine shaft and the combination motor and compressor, a single lever for operating either of the said connections, a valve operated by the said lever for supplying compressed air to the combination motor and compressor, and automatic means for operating the said lever to disengage one of the said connections when the air pressure in the system reaches a predetermined amount.

In testimony whereof I affix my signature, in presence of two witnesses.

JOHN E. MILLER.

Witnesses:
C. H. POPE,
L. A. POPE.

Copies of this patent may be obtained for five cents each, by addressing the "Commissioner of Patents, Washington, D. C."